Jan. 24, 1956  M. M. ARNOULD  2,731,949
PARAKEET MIRROR PERCH
Filed April 30, 1954  2 Sheets-Sheet 1
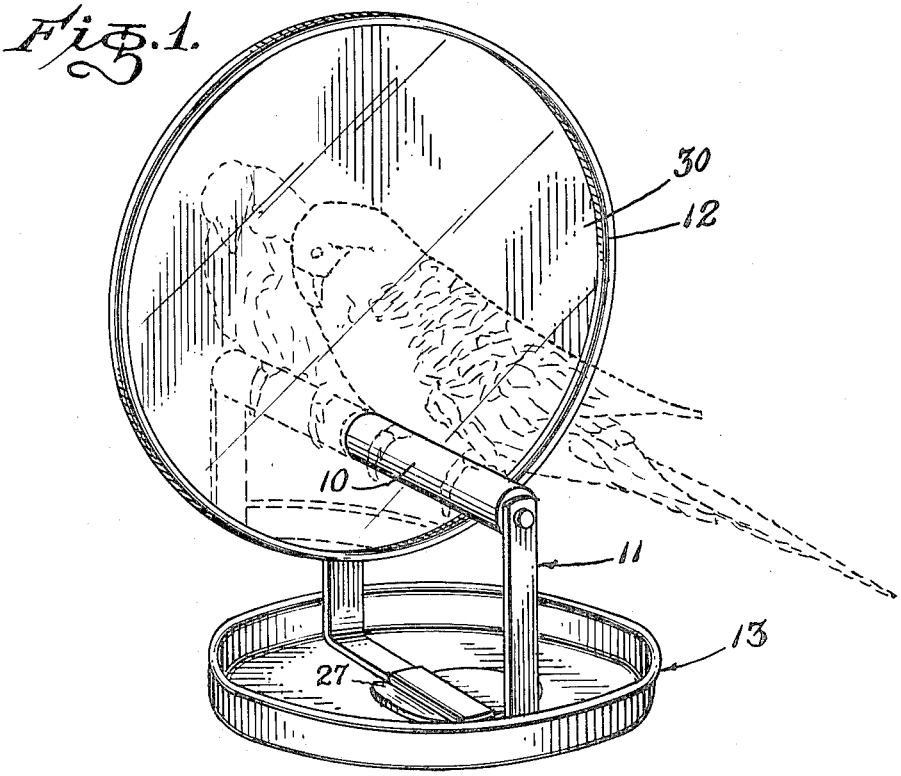
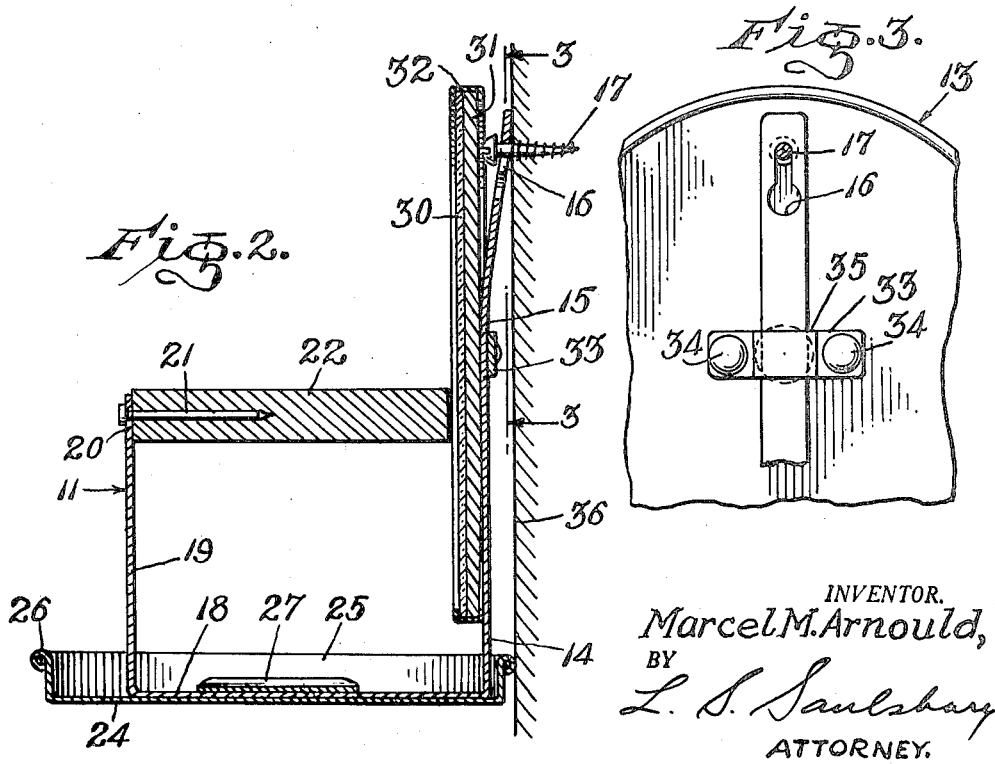
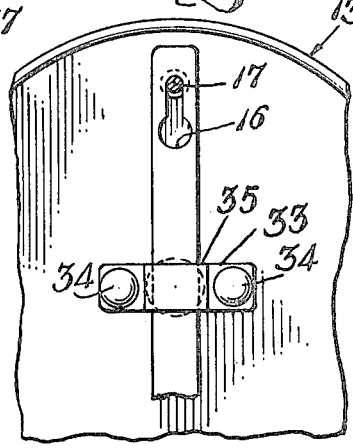
INVENTOR.
Marcel M. Arnould,
BY
L. S. Saulsbury
ATTORNEY.

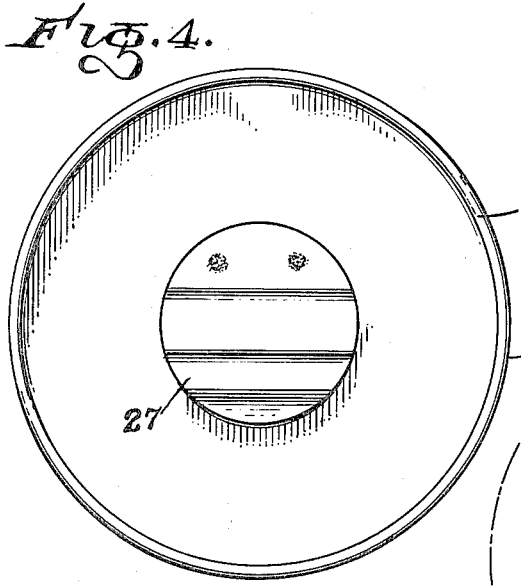
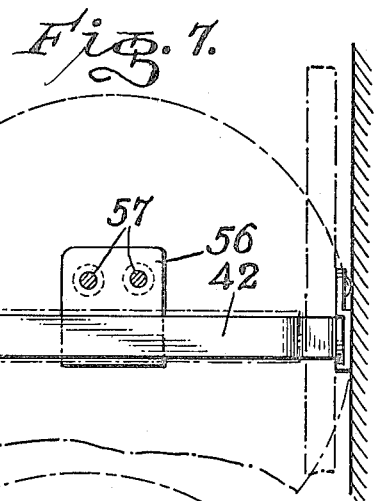
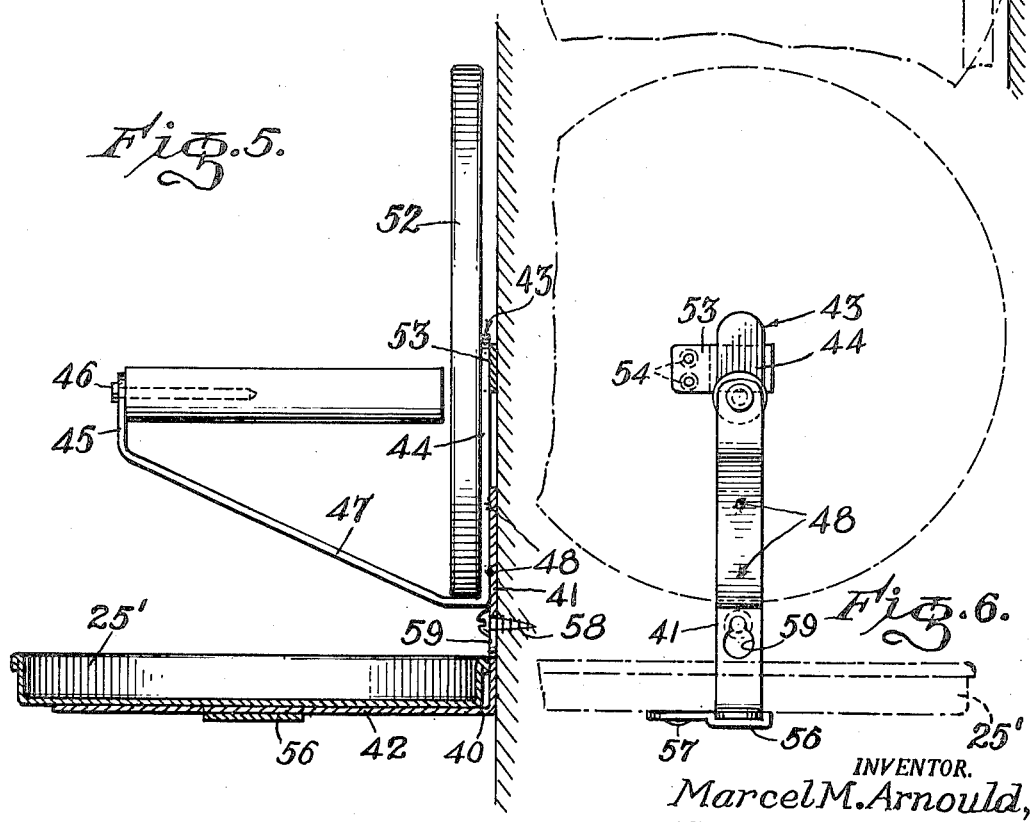

United States Patent Office 2,731,949
Patented Jan. 24, 1956

2,731,949
PARAKEET MIRROR PERCH
Marcel M. Arnould, East Orange, N. J.
Application April 30, 1954, Serial No. 426,676
7 Claims. (Cl. 119—26)

This invention relates to bird perches and more particularly to a wall bracket wall perch that may be flush-mounted against a vertical wall.

Domesticated parakeets, as well as other relatively small birds, are often permitted to fly about in the home and are known to be quite entertaining to observe in their antics as they alight on various articles of furniture. It has been observed that parakeets particularly fly towards mirrors and appear to be quite amused when viewing their own image in the mirror. However, lacking a place to alight adjacent the mirror, they merely hover about the mirror and then seek a place to perch elsewhere.

The present invention has as an object to provide a wall bracket perch provided with a mirror adjacent the perch.

Another object of this invention is to provide a wall bracket perch with a dropping tray.

Still another object of this invention is to provide a novelty wall bracket perch having a mirror adjacent the perch and a dropping tray supported conveniently beneath the perch.

A further object of this invention is to provide a novelty wall bracket suitable for hanging on a vertical member on which may be suspended a mirror surface, a perch adjacent the mirror surface, and a removable dropping tray disposed beneath the perch.

Other objects of this invention are to provide a wall bracket perch that is simple and durable in construction, easily attachable to a vertical wall, may be easily moved from one place to another, and may be manufactured with a minimum of parts.

For other objects and a better understanding of the invention reference may be had to the following detailed description taken in connection with the accompanying drawing, in which:

Figure 1 is a perspective view illustrating one embodiment of the present invention;

Fig. 2 is a side elevational view, partially in section, of the embodiment shown in Fig. 1;

Fig. 3 is a partial rear view of the suspending bracket and mirror taken substantially along the plane of line 3—3 of Fig. 2;

Fig. 4 is a plan view of the dropping tray used in Fig. 1;

Fig. 5 is a side elevational view, partially in section of a modified embodiment of the present invention;

Fig. 6 is a rear elevational view of a modified embodiment illustrating another bracket construction supporting modified mirror and dropping tray elements, the mirror and tray being shown in broken line relation with the bracket; and Fig. 7 is a plan view illustrating the bracket showing the tray and mirror, in broken line, as related to the bracket construction.

Referring now more particularly to the drawings, wherein like numerals represent similar elements and wherein there is illustrated broadly in Fig. 1 a parakeet supported on a perch 10 carried by the wall bracket 11 which bracket also carries the mirror 12 mounted parallel to the supporting vertical wall, and the dropping tray supported at a right angle to the mirror 12 and directly beneath the horizontal perch 10. The bracket 11, as illustrated in Fig. 2, is a flat, substantially U-shaped supporting frame having an elongated leg 14 which is offset slightly at 15 to facilitate flush wall mounting through the keyhole slot 16 by means of a screw 17 or other suitable fastening means, such as a hook. The elongated leg 14 extends downwardly to the straight horizontal portion 18 of the bracket 11, then the bracket is turned upwardly to form the vertical perch supporting leg 19. The vertical perch supporting leg 19 is provided with a hole 20 through which a fastening means, such as the nail 21, is passed to support the round perch rod 22 at one end, normal to the vertical perch supporting leg, so that the perch 22 will be resiliently retained in substantially a horizontal position.

A circular dished dropping tray 24 having a circular rim 25 and turned lip 26 therearound is provided with a flat clamping plate 27, open on one side, secured as by rivets, or the equivalent, to the bottom of the tray 24 to be supported and mounted on the bracket adjacent the horizontal flat portion 18. By providing the tray 24 with the open end clamping plate 27, the tray 24 may be readily removed from the horizontal portion 18 for cleaning, merely by slipping the tray laterally from the horizontal portion 18.

A circular mirror surface 30, having a suitable backing material 31, is retained by the circular rim 32 to form the mirror assembly 12. The mirror assembly 12 is supported by having a mirror clamp 33 mounted on the rear surface of the backing material 31 by use of rivets 34 or other suitable means. The mirror clamp 33 is provided with an offset at 35 so as to frictionally engage the vertical leg 14 of the bracket 11 in order to retain the mirror in position on the bracket in parallel relationship to the wall 36 or other vertical mounting surface.

In Figs. 5, 6 and 7 inclusive, there is illustrated a modified embodiment of the present invention in which the L-shaped bracket 40 is provided with a vertical wall mounting leg 41 and a horizontal tray supporting leg 42. An integral mirror and perch supporting bracket 43 is bent to provide a vertical mirror supporting portion 44 and a vertical perch supporting bracket 45 having perch supporting hole 46, and an intermediate portion 47 disposed angularly between vertical supporting portion 44 and the supporting bracket 45.

By spot welding the L-shaped bracket 40 and the perch supporting bracket 43 together, as at 48, there is provided a combination bracket. This combination bracket is then suitable for supporting a perch 49 horizontally and normal to the mounting wall 50 by the fastening means 51 passed through the hole 46 bracket member 45. A mirror 52, similar to that in Fig. 1, is provided with a spring clamping plate 53 fastened to the mirror backing by rivets 54 placed at one side of the plate 53. The dropping tray 25′, similar to tray 24, is also provided with a spring clamping plate 56 secured by rivets 57 at one side of the plate. Both of the spring clamping plates 53 and 56 frictionally engage the flat sections of the wall bracket so that mirror and dropping tray may be removed independently therefrom for cleaning without necessitating the removal of the wall bracket from its mounting position. A screw 58 passes through the keyhole recess passing through the bracket 40 to hold the bracket firmly in its position against the wall.

While various changes may be made in the detail construction, it shall be understood that such changes shall be within the spirit and scope of the present invention as defined by the appended claims.

What is claimed is:

1. A parakeet mirror perch comprising a bracket adapted to be vertically mounted upon a wall, said bracket having vertical and horizontal portions, a perch horizontally supported from said bracket, a dropping tray spaced vertically beneath the perch on a horizontal portion of the bracket, means on said tray for releasably engaging said horizontal portion of the bracket, a mirror mounted on the vertical portion of the bracket and means for mounting said bracket vertically upon a wall.

2. A parakeet mirror perch comprising a wall bracket, said bracket having horizontal and vertical supporting means, a perch horizontally supported on said bracket, a dropping tray mounted on the horizontal supporting means of the bracket and a mirror vertically mounted normal and adjacent one end of the perch.

3. A parakeet mirror perch consisting of a bracket having at least one horizontal and at least one vertical portion, means for vertically mounting the bracket on a wall, a perch supported by one of said vertical portions of said bracket, and a tray releasably mounted on one of the horizontal portions of the bracket and spaced beneath the perch.

4. A parakeet mirror perch comprising a bracket having horizontal and vertical portions, means for vertically mounting the bracket on a wall, a tray releasably mounted on the horizontal portion of the bracket, a mirror mounted on said bracket, and a perch supported by said bracket above said tray and projecting inwardly toward an intermediate portion on said mirror.

5. A parakeet mirror perch comprising a bracket having horizontal and vertical portions, means for vertically mounting said bracket on a wall, a perch supported by said bracket, a tray releasably mounted on the horizontal portion of the bracket and spaced beneath the perch, and a mirror releasably mounted on said bracket adjacent the perch.

6. A parakeet mirror perch comprising a U-shaped wall bracket having one elongated vertical leg and a straight horizontal portion, means for securing said elongated vertical leg to a wall, a dropping tray mounted on the horizontal portion of said bracket, clamping means for releasably securing said tray to said bracket, a mirror mounted on said elongated bracket leg, clamping means for releasably securing said mirror to said bracket and a horizontal perch secured to the shorter vertical leg of said U-shaped bracket and projecting inwardly toward said mirror above said tray.

7. A parakeet mirror perch comprising a wall bracket including an L-shaped portion having a vertical and a horizontal leg, and a perch supporting portion including a short vertical member and an angular member connecting said short vertical member with the vertical leg of said L-shaped portion, means for securing said L-shaped portion to a wall, a dropping tray releasably secured to the horizontal leg of said L-shaped portion, a mirror releasably secured to the vertical leg of said L-shaped portion, and a horizontal perch secured to the vertical member of said perch supporting portion and projecting inwardly toward said mirror above said tray.

References Cited in the file of this patent

UNITED STATES PATENTS

| D. 167,326 | Verosub et al. | July 22, 1952 |
| 1,627,448 | Mueller | May 3, 1927 |
| 2,221,840 | Little | Nov. 19, 1940 |